United States Patent [19]
Berger

[11] 3,786,459
[45] Jan. 15, 1974

[54] PROPORTIONAL POSITION CODER
[75] Inventor: Henri Berger, Triel sur Seine, France
[73] Assignee: Societe D'Applications Generals D'Electricite et de Mecanique, Paris, France
[22] Filed: Oct. 11, 1972
[21] Appl. No.: 296,579

[30] Foreign Application Priority Data
Oct. 13, 1971 France............................. 7136687

[52] U.S. Cl.................... 340/196, 318/653, 323/51, 324/34 PS
[51] Int. Cl............................................. G08c 19/00
[58] Field of Search...................... 340/196; 323/51; 318/653, 656; 324/34 PS

[56] References Cited
UNITED STATES PATENTS
2,415,819  2/1947  Halpert et al...................... 318/653
3,217,308  11/1965  Maxwell, Jr. ........................ 340/196

Primary Examiner—John W. Caldwell
Assistant Examiner—Robert J. Mooney

[57] ABSTRACT

A position coder for a moving shaft generates a DC voltage having an amplitude which is proportional to the magnitude of position shift of the moving shaft of said coder with respect to a fixed point and a sign which changes whenever a shift in direction takes place. The position coder includes a disc-shaped stator with a plurality of windings equiangularly distributed along said stator and a plurality of pairs of detection coils, also angularly distributed, the first of the paired coils being at a given distance from the rotor center and the second coil of the same pair at a different distance from said center, and a rotor set up by a disc and bearing two metallic ramps, one opposite to the first windings and the other opposite to the second windings of the stator, said ramps being so arranged that the distance from ramp points to the stator varies along each ramp. The position coder may be used in servo-motors.

3 Claims, 6 Drawing Figures

PROPORTIONAL POSITION CODER

The present invention relates to a position coder for a shaft which is servo-controlled and which operates by generating a DC voltage having an amplitude which is proportional to the magnitude of the position shift of the moving shaft in relation to a fixed point, and with a sign change whenever shaft direction changes.

It is known to position a rotary-controlled system servo by selecting predetermined reference angles defined by a given number. These known systems are classified into two categories :

The first consists in fastening a coder onto the servo-controlled shaft, to compare the number provided by this coder to the number emerging at the input. There is thus obtained a DC or AC voltage varying incrementally whenever the controlled shaft rotates and when the number provided at the input remains constant, the voltage may vary reciprocally, with the servo-control being of the all or nothing type.

The advantages derived from this first category of servo-controlled systems are that by using a suitable coder, which may be optical, capacitive, or inductive, etc., no wear due to friction is to be feared because there is no contact between the fixed part and the rotating part, and the reference positions are perfectly well defined in the original equipment. The main drawback is that it is not always possible to provide a voltage that is proportional to the displacement to the motor driving the slave shaft and as long as the provided voltage is not at least equal to a specific angle increment, the motor does not receive any voltage ; there is a dead range that is at least equal to that voltage which results from an angle increment.

The servo-controlled systems of the second category fasten a linear detector on the controlled shaft, for instance a potentiometer, and transform the number provided at the input into a voltage in an analog/digital decoder. The potentiometer and the decoder are fed by the same DC or AC voltage and their output voltages are compared in a differential amplifier and the slaving that is obtained is linear. In other words, the torque generated by the motor turning the shaft increases in proportion with the deviation, even if the latter is less than an angle increment, but accuracy of the reference position depend upon the difference between digital-/analog decoder linearity and that of the linear detector.

The main purpose for this invention is to generate a coder for a servo-controlled system of the first category with the essential difference that the slaving thus obtained is linear.

According to the invention, the proportional coder includes a disc-shaped stator with a plurality of operating windings distributed equiangularly along said stator and a plurality of pairs of detection coils, also distributed equiangularly, the first of the paired coils being at a given distance from rotor center and the second coil of the same pair being at a distance that is different from said center, and a rotor set up by a disc and bearing two metallic ramps, one opposite to the first windings and the other opposite to the second windings of the stator, said ramps being so arranged that the distance from ramp points in relation to the stator varies in the extension of each ramp.

One of the operating windings is fed by an AC current, it energizes at the same time an induced current in the two detection coils linked thereto and this AC energized winding also generates eddy currents in the conductor element of the ramps of the rotor. A differential signal is generated which corresponds the induced current in said a pair of detection coils and depends in magnitude upon either the presence of or upon the lack of ramps under the so energized detection coils and also depends on the distance to the ramp that is present under the coil. The result is that a rotor position corresponds to a energized operating winding, and for which rotor the coder output signal is null. Accuracy of the rotor position depends only upon the accuracy with which the winding position has been defined.

The invention shall now be described in detail and in relation to annexed drawings, wherein.

Figure 1:
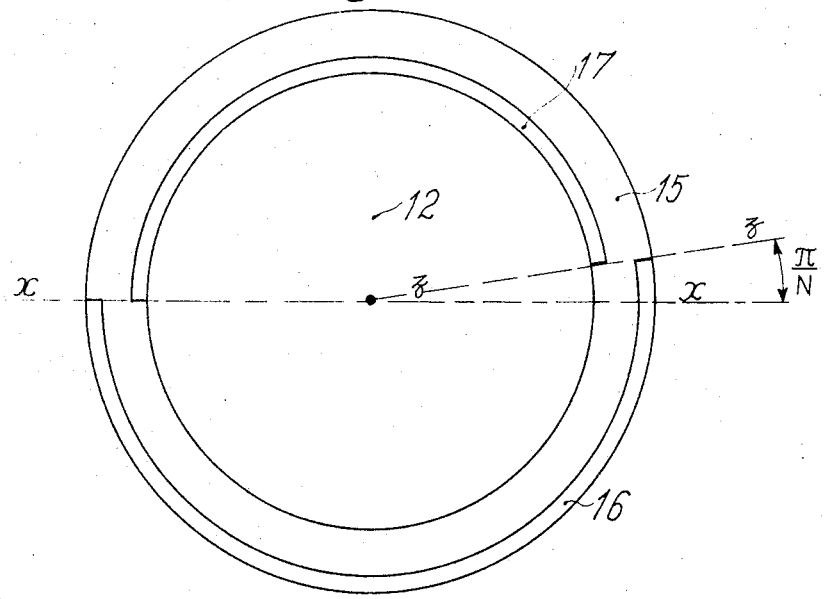
FIG. 1 illustrates a diagrammatic planer view of a rotor element in accordance with the invention.
Figure 2:
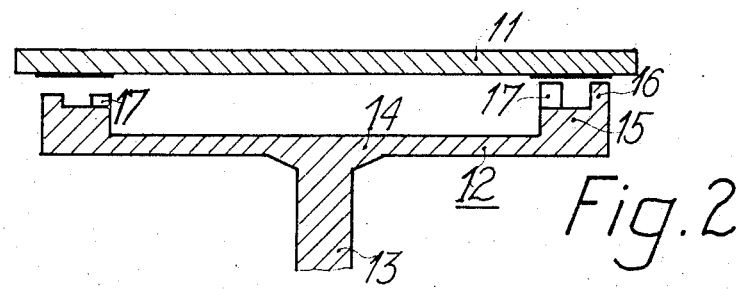
FIG. 2 shows an axial sectional view of a stator element together with an axial section of a rotor element in accordance with the invention.

In FIGS. 1, 2, 3, 4, the proportional coder comprises a stator 11 and a rotor 12 driven by shaft 13. Rotor 12 is shaped as a plate 14 surrounded by an edged flange 15. The flange outer wall is edged and extended as a cam 16 for a development of 191°15′, in the example which is selected of 16 reference positions per revolution, the cam section being a fraction of an ellipse in an oblique plane in relation to the rotor shaft.

The inner edged flange wall is extended to form cam 17 for a development of 168°45′ in the example chosen of 16 reference positions per revolution, the cam section being also a fraction of an ellipse in the same oblique plane as for that of cam 16. The high points (in relation ot the stator) 62 and 72, on the one hand, and low points 61 and 71, on the other hand, are adjacent the ones to the others, respectively.

Generally speaking, N being the number of reference positions per revolution, cam edge extensions are of $(1 + 1/N)$ for the one and of $(1 - 1/N)$ for the other, respectively. This applies as well to the outer or to the inner cam. In the selected example : N=16, the cam with the broadest extension is the external one (cf. FIG. 1).

The whole rotor, or at least its cams, is built of a conductive material in which eddy currents can be generated. The stator (FIG. 4) is shaped as an insulated plate and includes a series of sixteen windings $20_0$ to $20_{15}$, each comprising an excitation winding 21, and two detection windings $22'$ and $22''$, all three overlapping. The coil turns are printed square metallic turns on an insulated support 23 with radial or orthoradial sides, the excitation winding being a full turn and detection windings being two insulated half-turns forming a complete turn.

Each excitation coil is fed individually and selectively by an energizing voltage supplied thereto by means of a switch. For instance, coil $21_1$ may be energized by an alternating voltage applied between terminals B and ground G, by means of the switch contact C $21_1$. It must be understood that all excitation coils may be energized by said voltage by means of further contacts (not shown) of said switch. Said contacts may be actuated manually by an operator. Radii passing at mid-turns represent the proportional coder reference positions.

The detection coils half-turns are coupled to the two halves of the associated excitation coil, respectively ; all half-turns 22' are series connected between terminals 25 and 26, and all half-turns 22' are connected between the terminals 27 and 28. Terminals 25 and 28 are grounded together and terminals 26 and 27 are connected, respectively, to the two inputs of a differential amplifier, while the latter's output can be connected to the input of a reversible electric motor having a rotor driving the shaft 13 (FIG. 2) and controlled by a motor torque that is a function of the signal generated between said terminals 26 and 27. This motor has therefore 16 balance positions available corresponding to the stable zero settings of said signals.

Figure 3:
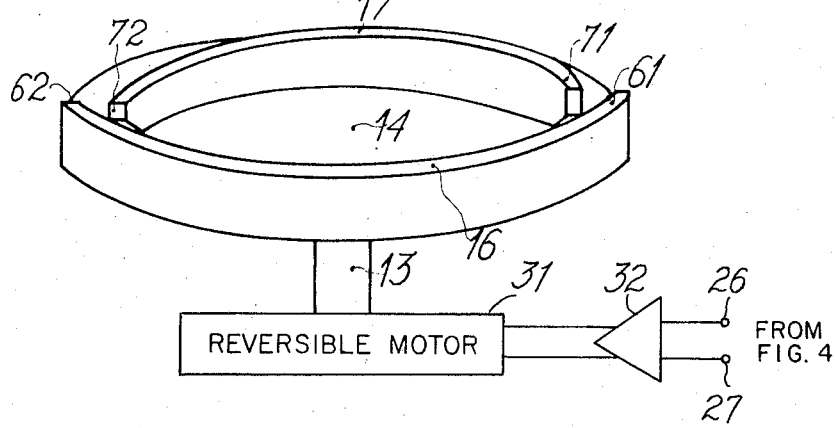
FIG. 3 shows a diagrammatic and perspective view of a rotor element and a stator element in accordance with the invention.
Figure 4:
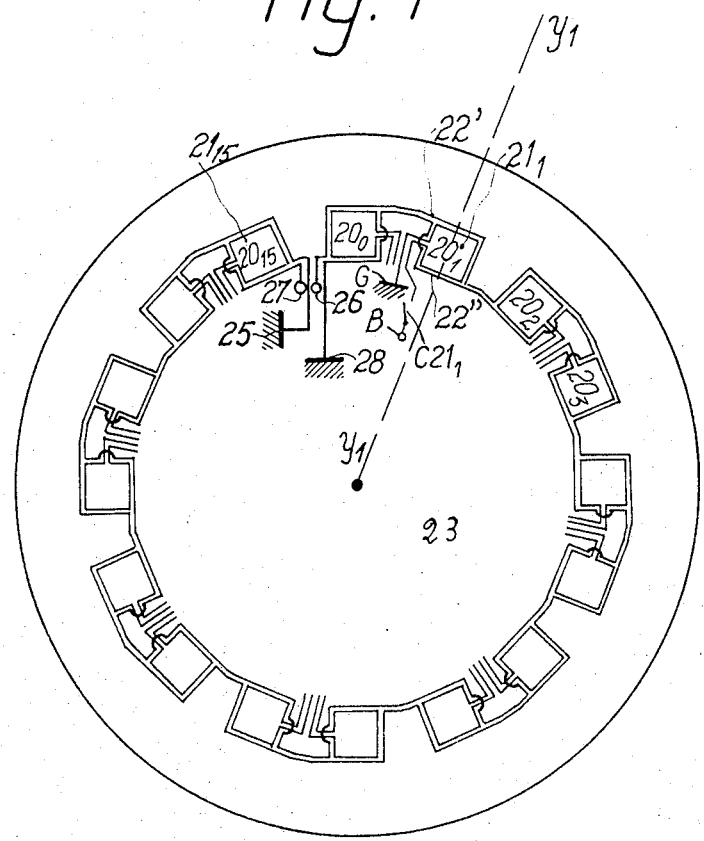
FIG. 4 shows a diagrammatic planar view of a stator element in accordance with the invention.

Such a reversible motor system, the position of which is controlled by a signal, is described, for instance, in the U. S. Pat. No. 2,415,819 to R. Halpert et al. In FIG. 3, such a reversible motor is shown at 31, the control signal from terminals 26 and 27 (FIG. 4) being amplified by an amplifier 32 before its being applied to 31.

The proportional coder operates as follows. With a selected reference position, the first for instance, the decoder feeds alternating current to the excitation winding $21_1$ whose median radius $y_1y_1$ represents the reference position. A portion of cam 16 is set under this winding, or a portion of cam 17. The rotor ramps which is under an energized excitation coil appropriately conducts eddy currents which generate an electromagnetic field opposite to that generated by the corresponding excitation coil, and therefore, one of the detection wires 22' or 22'' (FIG. 4) provides an induced voltage lower than the other. The difference between the two induced voltages represents the proportional coder output voltage.

This voltage has a phase shift depending on whether the nearest rotor cam of the selected excitation coil is the external cam 16 or the internal cam 17. The amplitude of said voltage varies conversely with the distance which separates the given cam from the excitation coil. This amplitude reaches null reading (FIG. 6) when the reference position represented by the radius yy coincides with the radius passing through low points 61 and 71 of the ramps or with radius passing through high points 62 and 72 of the ramps (these two radii forming between themselves angle $\pi/N$, or 11°15').

Figure 5:
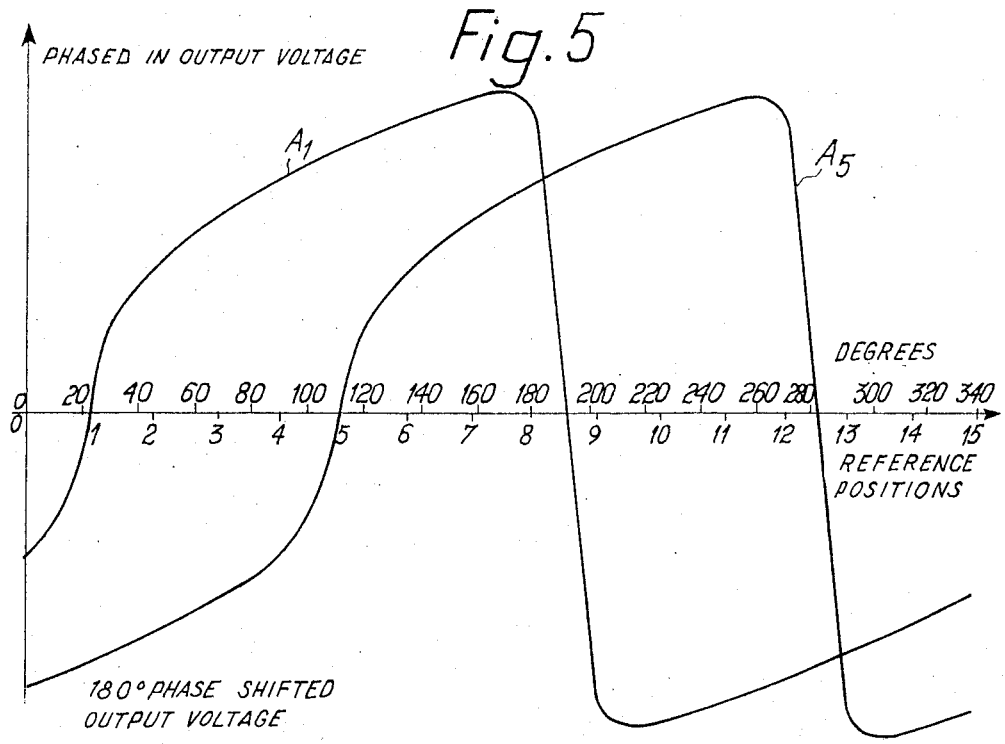
FIG. 5 depicts the proportional coder output signal in line with operating winding signal, as energized.

FIG. 5 shows output signals $A_1$ and $A_5$ of the proportional coder for two reference positions, the reference positions No 1 and 5, in function of rotor angle, always in case of the example selected with 16 balance positions per revolution.

Figure 6:
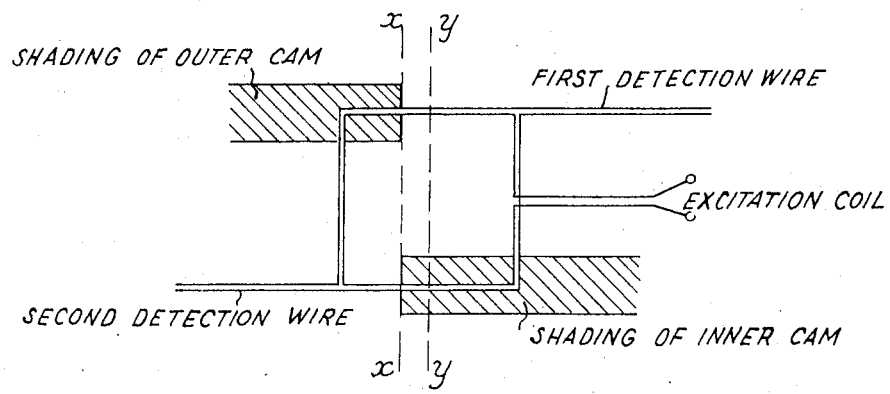
FIG. 6 is a schematic diagram to explain the proportional coder operation.

It should be pointed out that the difference in cam extension the servo-controlled element to take an unstable balance position zero between two other stable balance positions (the stable balance position No 1 corresponds to the first zero of signal $A_1$, in other words to the angle $2\pi/2N$, or 22°30', as shown at 1 on the abscissa axis in FIG. 6), and due to the fact that the system is balanced at a given position, there is a constantly decreasing error voltage as soon as another coil is selected, even if it is the phase shifted by 180° $\pi$ in relation to that where balance was achieved. Moreover, any angular displacement of shaft 13 from one position to another is less than $\pi$.

In a proportional coder built by the applicant, rotor and stator diameter is 25 mm ; the distance from high points of the ramps to the stator is 25 mm and the distance from low points to the stator is 0.3 mm ; the power frequency is 2.5 MHz.

The proportional coder of said invention presents specific advantages in addition to specific advantages proper to inductive potentiometers, that is the absence of brushes. Further the moving part could be set at an indefinite potential, to ground for instance, ant it does not therefore require any contact. Furthermore, it has the advantage of having unlimited rotation.

The proportional coder of said invention presents, in addition to the specific advantages related to digital coders, in other words the presence of reference positions that are perfectly well defined by the builder, the special advantage that its output voltage is proportional to the shift independently of the angular position of the rotor in relation to the stator.

Which is claimed is :

1. A proportional position coder for a servo-controlled shaft which includes a disc-shaped stator with a plurality of excitation coils equiangularly distributed on said stator and a plurality of pairs of detection coils, also equiangularly distributed, the first of the pair of detection coils being at a certain distance from rotor center and the second detection coil of the same pair being at a different distance from said center, a disc-shaped rotor bearing two metallic ramps, one opposite to the first coils and the other opposite to the second coils of the stator, said ramps being so profiled that the distance of ramp points in relation to the stator varies, along an angular extension of each ramp, means for energizing selectively an excitation coil and means for connecting in series the first detection coils between themselves and the second detection coils between themselves, so as to generate an analog position signal between these first and second detection coils.

2. A proportional coder in accordance with claim 1, characterized in that one ramp angular extension is broader than that of the other ramp, the high points of the two ramps having the same height, and being disposed on the same rotor radius, and the low points of the two ramps being on a same second radius of the rotor not located within the extension of the first radius.

3. A proportional coder in accordance with claim 1, characterized in that the stator is an insulating disc and the excitation and detection coils are printed circuits on said rotor.

* * * * *